United States Patent [19]

Klutts

[11] 4,350,666

[45] Sep. 21, 1982

[54] APPARATUS FOR DISPENSING A CHEMICAL INTO A FLUID

[76] Inventor: James H. Klutts, 2076 W. 9th Ave., Apache Junction, Ariz. 85220

[21] Appl. No.: 179,507

[22] Filed: Aug. 19, 1980

[51] Int. Cl.³ .............................................. B01D 11/02
[52] U.S. Cl. ....................................... 422/263; 4/228; 4/DIG. 10; 137/268; 422/264; 422/277
[58] Field of Search .................. 422/37, 58, 263, 264, 422/276, 277; 137/268; 4/228, DIG. 10; 239/57, 60

[56] References Cited

U.S. PATENT DOCUMENTS

| | | | |
|---|---|---|---|
| 1,803,860 | 5/1931 | Marks | 4/228 X |
| 3,772,715 | 11/1973 | Nigro | 4/228 |
| 3,837,017 | 9/1974 | McDuffee | 4/DIG. 10 |
| 3,867,101 | 2/1975 | Herring | 4/228 X |
| 4,217,331 | 8/1980 | Schaub | 422/277 X |

FOREIGN PATENT DOCUMENTS 18400 of 1892 United Kingdom ................... 4/228

Primary Examiner—Richard L. Chiesa
Attorney, Agent, or Firm—Harry M. Weiss

[57] ABSTRACT

This disclosure relates to an apparatus for dispensing which incorporates a jacketed compressed pellet of soluble material provided with an effective mixing chamber having a restricted opening to a surrounding ambient fluid to serve as a device to control the rate of dissolution of the chemical into the ambient fluid so that the dispensing apparatus has a service life substantially greater than the devices of the prior art.

11 Claims, 6 Drawing Figures

APPARATUS FOR DISPENSING A CHEMICAL INTO A FLUID

BACKGROUND OF THE INVENTION

1. Field of the Invention

This invention relates generally to dispensing apparatus and, more specifically, to dispensing apparatus for dissolving a chemical in an ambient fluid. Typical applications would include dispensing a disinfectant, a deodorant or a coloring agent into water in a toilet reservoir, a spa or a hot tub.

2. Description of the Prior Art

In the past, various devices have been used to dispense chemicals into a fluid. One approach to dispensing such chemicals is illustrated by the use of chlorine pellets, such as commonly are used for disinfecting swimming pools. The chlorine pellets were simply dropped within the water of the pool and allowed to dissolve. The rate at which the pellet dissolved was substantially controlled by the surface area exposed to the water. The rate of dissolution was quite rapid when the pellet was placed in the water, and diminished in proportion to the remaining surface area of the pellet, which area was continually reduced by the removal of the outer portions of the pellet. Furthermore, the chlorine pellets were quite mechanically fragile, and could be easily crumbled by mechanical impact as would occur when stepped upon.

Another approach to the dispensation of such chemicals is shown by U.S. Pat. No. 3,521,306, issued to E. C. Jacobs on July 21, 1970. The Jacob's patent teaches the use of a water soluble conditioning material contained within tapered cups, and a housing to be mounted in, for example, a flush toilet reservoir, to retain a plurality of the conditioning material filled cups. The cups were "nested" so that the lower cups had a portion of their previously exposed dissolving surface shielded by a superior other one of the cups, with the uppermost cup having a dissolving surface of the soluble material fully exposed to the fluid in the reservoir. While the dissolution rate of the soluble material within the lower cups was somewhat limited by the interference provided by the upper cups, the rate of dissolution of the soluble material within uppermost cup was substantially unlimited. It can be seen that when a new soluble material filled cup was added, a maximal surface upon which dissolution can occur was provided. The rate of dissolution was thus increased, and as the soluble material entered solution, the tapered nature of the cup reduced the active surface available for entry of the chemical solution. In this manner, the rate of dissolution of the chemical was subject to substantial variation.

A further approach to the dispensation of such chemicals is shown by U.S. Pat. No. 3,837,017, issued to R. L. McDuffee on Sept. 24, 1974. The McDuffee patent teaches the use of a container at least partially filled with an impliedly loose, or granular, cleaning compound. The granular cleaning compound has a surface partially exposed to the fluid within the interior of the container and partially shielded by a plurality of inner pieces, such as stones. The implication that the cleaning compound is not a unitary mass, or solid, arises from the particular teaching of McDuffee that the "insert material may comprise stone, marbles, or any other solid . . . ," while nowhere specifying the composition of the cleaning compound. That implication is further reinforced by the failure of the McDuffee patent to anywhere teach a particular structural configuration for the cleaning compound contained within the container. Indeed, typical commercial applications of the device of the McDuffee patent, such as the "120-day Automatic Bowl Cleaner" have, in fact, utilized a granular compound to provide the cleaning action.

A need existed for a dispensing apparatus useful for dispensing chemicals into water, and having a service life substantially greater than the devices of the prior art.

SUMMARY OF THE INVENTION

In accordance with one embodiment of this invention, it is an object to provide an apparatus, having a protracted service life, for dispensing a soluble chemical.

It is another object to provide chlorine dispensing apparatus, having a protracted service life, for use in a toilet tank.

It is a further object to provide an apparatus for dispensing soluble chemical into a solvent fluid, having an indicator to permit one observing the solvent fluid to detect the imminent exhaustion of the chemical.

It is yet another object to provide an apparatus for dispensing a soluble chemical into a solvent fluid, having an indicator apparatus to permit one observing the solvent fluid to detect a complete exhaustion of the chemical.

It is still a further object to provide a method for packaging a chlorine pellet so that its service life is substantially extended.

It is again another object to provide a chlorine dispensing pellet having protection from mechanical impact.

DESCRIPTION OF THE PREFERRED EMBODIMENT

In accordance with one embodiment of this invention, an apparatus for dispensing a soluble chemical into a solvent fluid is disclosed, comprising: pellet means having an essentially planar surface for storing the chemical and further for substantially retaining the chemical as a unitary mass prior to dissolving; and substantially encapsulating case means for permitting the fluid restricted access to only the surface.

In accordance with another embodiment of this invention, a method for extending the service life of a chlorine dispensing pellet in a solvent fluid is disclosed, comprising the step of restricting the access of the fluid to a single planar surface of the pellet.

The foregoing and other objects, features and advantages will be apparent from the following, more particular, description of the preferred embodiments of the invention, as illustrated in the accompanying drawings.

THE SPECIFICATION

Figure 1:
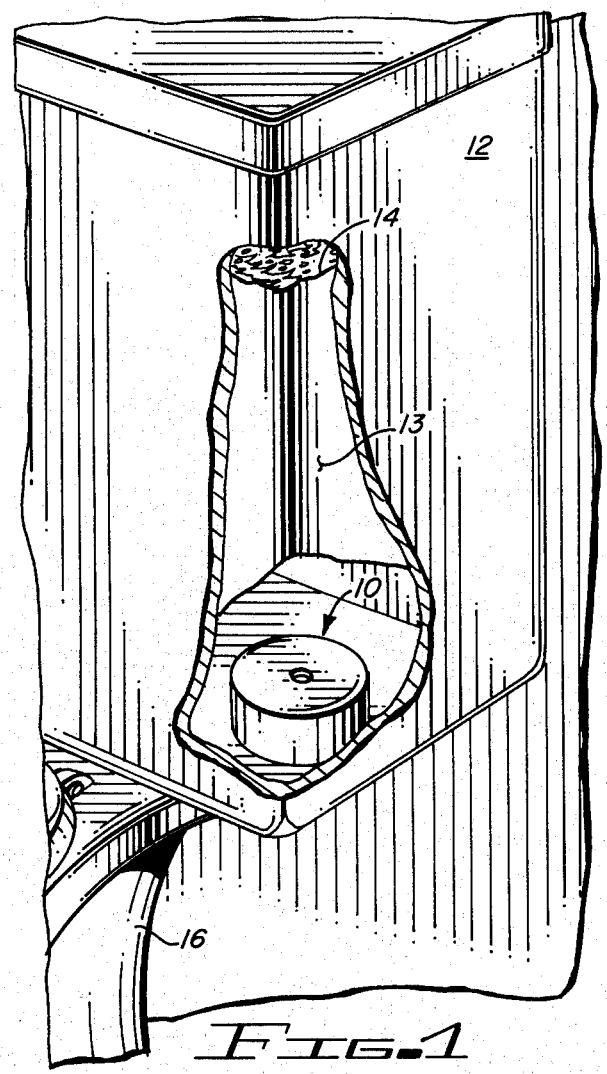
FIG. 1 is a perspective elevational view of an apparatus for dispensing a soluble chemical installed in the reservoir tank of a conventional toilet.

Referring to FIG. 1, a perspective elevational view of an apparatus for dispensing a soluble chemical into a solvent fluid is shown generally by reference number 10. The dispensing apparatus 10 is shown in a typical application, immersed, in a fluid 13 in a reservoir 12 of a conventional toilet, below the uppermost fluid level 14. As shown, the dispensing apparatus 10 can meter disinfectants such as chlorine, deodorizers or other chemicals into the reservoir 12, and ultimately into and through a toilet bowl 16.

Figure 2:
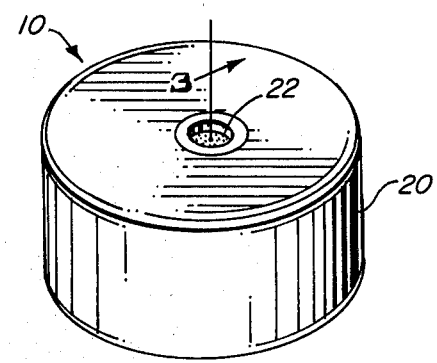
FIG. 2 is an enlarged perspective view of the apparatus for dispensing a soluble chemical.

Referring to FIG. 2, an enlarged perspective view of the apparatus for dispensing a soluble chemical 10 is shown. The dispensing apparatus 10 is provided with an external jacket 20 which is pierced only by an aperture 22.

Figure 3:
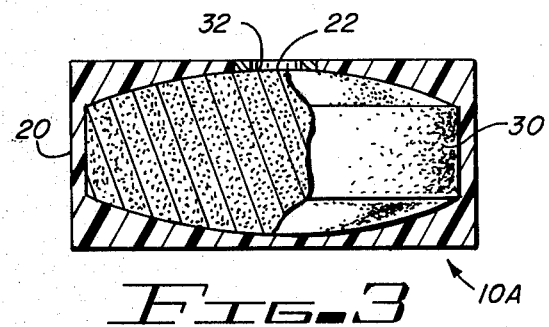
FIG. 3 is a sectional elevational view taken along line 3—3 of FIG. 2.

Referring to FIG. 3, a sectional view taken along line 3—3 of FIG. 2 is shown. In FIG. 3, a first embodiment of the dispensing apparatus is shown generally by reference number 10A. In the first embodiment 10A, the dispensing apparatus 10 is shown comprised of pellet means, as for example pellet 30, which pellet means are substantially encapsulated within case means, as for example the jacket 20. It can be seen that the pellet member 30 is provided with a surface 32, which surface is the source of the chemical dissolving into the fluid 13. The surface 32 is open through the aperture 22 in the jacket 20, to the surrounding fluid 13.

The pellet 30 can be fabricated from various materials depending upon the application. In the preferred embodiment, the pellet member 30 is comprised of a compressed compound having substantial free chlorine, so that the dispensing apparatus 10 can be used as a disinfecting device, as for example in a toilet 16 or a spa (not shown). Specifically, the preferred embodiment 10 utilizes a compressed pellet of 100% TRICHLORO-S-TRIAZINETRIONE, which has 90% free chlorine availability.

It can be seen that the step of restricting the access of the fluid 13 to the single planar surface 32 also comprises a method for extending the service life of the soluble pellet 30.

As the rate at which the pellet member 30 dissolves is a function of the density of the pellet member 30, that density is preferably held within a range of 1.25 gm./cm.$^3$ to 1.75 gm./cm.$^3$ Furthermore, to permit the dispensing apparatus 10 to reliably function over a protracted period, the pellet member 30 is preferably substantially impermeable to the fluid 13. The chemical contained within the pellet member 30 can thus be retained as a single unitary mass, by preventing a saturation and crumbling of the pellet member 30. Such a deterioration of the pellet 30 would substantially increase the surface area exposed to the fluid 13, and thereupon greatly increase the rate at which the pellet member 30 dissolves.

With the essentially planar surface 32 existing immediately adjacent the aperture 22, the initial rate at which the pellet member 30 dissolves will be quite rapid. The rapid initial rate of dissolving is due to the immediate proximity of the fluid 13 to the surface 32, and further due to the relatively low concentration of the chemical already present in the ambient fluid 13, immediately adjacent the aperture 22.

Figure 4:
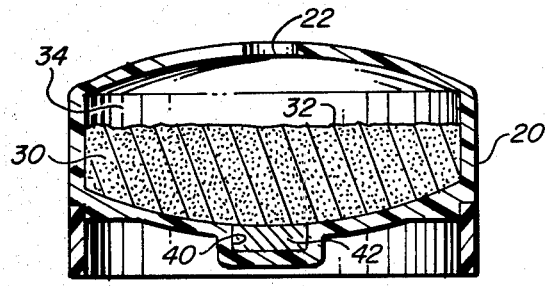
FIG. 4 is a sectional elevational view of an alternate embodiment of the apparatus for dispensing a soluble chemical also taken along line 3—3 of FIG. 2.

Referring then to FIG. 4, a second embodiment of the dispensing apparatus is shown generally by reference number 10B. In FIG. 4, the second embodiment 10B is shown after a substantial period of use, wherein a portion of the pellet member 30 has gone into solution in the fluid 13, diffused through the aperture 22 and then been transported away by flow of the fluid 13, as for example, by flow into the toilet bowl 16.

It can also be seen that the combination of a substantial, essentially constant, planar surface 32 exposed to the fluid 13, and a single remote aperture 22 functioning as an only outlet to the balance of the surrounding fluid 13, limits the rate of the dissolution of the pellet member 30. The controlled rate of dissolution is due to the relatively high concentration of the chemical of the pellet member 30 in solute form within the now vacated portion 34 of the jacket 20. While the solute chemical is free to diffuse through the aperture 22 into the fluid 13, the high concentration within the portion 34 substantially limits the rate of dissolution from the surface 32.

The rate of diffusion of the solute chemical within the portion 34 into the ambient fluid 13 is substantially controlled by the size and length of the aperture 22 and the relative concentration of the solute chemical within the portion 34 with respect to the concentration of the chemical in the ambient fluid 13. As the size of the aperture 22 is fixed and the concentration of the chemical in the portion 34 is maintained near a saturation level by the large store of chemicals available from surface 32, the rate at which the pellet 20 dissolves remain substantially constant over the life of dispensing apparatus 10.

In the second embodiment 10B, the dispensing apparatus is also provided with dye means, as for example a pocket 40 formed in the jacket member 20 containing a dye 42, for indicating at least the imminent exhaustion of the chemical of the pellet member 30. In the second embodiment 10B, the dye means are disposed to indicate the complete consumption of the pellet member 30, by permitting the surrounding fluid access to the highly soluble dye 42 only when the pellet member 30 has completely dissolved. To clearly indicate the total exhaustion of the pellet member 30, the dye 42 is preferably bright red in color. A bright red color will provide a dramatic indicator when the second embodiment 10B has reached the end of its useful life.

Figure 5:
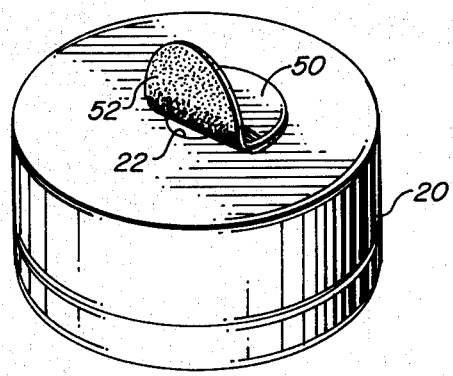
FIG. 5 is a sectional elevational view of a third embodiment of an apparatus for dispensing a soluble chemical taken along line 3—3 of FIG. 2.

Referring then to FIG. 5, a third embodiment of the dispensing apparatus is shown generally by reference number 10C. In the third embodiment 10C, the dye means are shown comprised of a pocket 41, formed in the pellet member 30 and filled with the soluble dye 42. Thus the dye means of the third embodiment 10C are disposed to indicate an approach to the exhaustion of the chemical, by permitting the dye 42 to enter the solution within the portion 34, and hence to enter the ambient fluid 13, only when the pellet 30 is substantially exhausted. By utilizing a dye 42 having a dissolution rate near that of the chemical, the dye 42 and the chemical can be synchronized to exhaust simultaneously. In this manner, appearance of the dye can signal the imminence of exhaustion, and the disappearance of the dye 42 can signal the totality exhaustion of the pellet 30.

Figure 6:
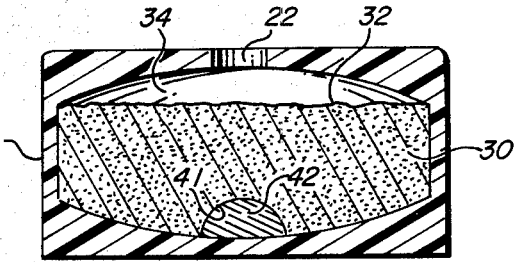
FIG. 6 is a perspective view of a market-ready apparatus for dispensing a soluble chemical.

Referring then to FIG. 6, a perspective view of the preferred embodiment of the dispensing apparatus 10 is shown in a market-ready configuration. A label 50, shown in a partially removed condition, has been positioned to seal the aperture 22. The label 50 has an adhesive surface 52, allowing the label to be removed to permit use of the dispensing apparatus 10.

While the invention has been particularly described and shown in reference to the preferred embodiments thereof, it will be understood by those skilled in the art that various changes in form and detail and omissions may be made therein without departing from the spirit and scope of the invention.

What is claimed is:

1. An apparatus for dispensing a soluble chemical into a solvent fluid, comprising:
pellet means comprising a solid unitary body of said soluble chemical and having substantially planar surfaces for substantially retaining said chemical as a unitary mass prior to dissolving;
substantially encapsulating non-separable case means in contact with all but a small portion of one of said planar surfaces of said solid unitary body for initially permitting a fluid restricted access to only said planar surface portion of said solid unitary body.

2. An apparatus in accordance with claim 1 wherein said case means comprising:
a jacket having communication with said pellet means;
said jacket provided with an aperture having an area substantially smaller than the area of one of said surfaces; and
said aperture having a common opening to one of said surfaces and to said fluid.

3. An apparatus in accordance with claim 2 wherein said jacket having impermeability to said fluid.

4. An apparatus in accordance with claim 3 wherein said pellet means comprising a pellet of said chemical.

5. An apparatus in accordance with claim 4 wherein said pellet having substantial impermeability to said fluid.

6. An apparatus in accordance with claim 5 wherein:
said fluid comprising water; and
said chemical comprising a material having substantial free chlorine.

7. An apparatus in accordance with claim 6 wherein said aperture having an area comprising 2 percent to 4 percent of the area of one of said surfaces.

8. An apparatus in accordance with claim 6 wherein said pellet means further comprising dye means for indicating at least the imminence of exhaustion of said chemical.

9. An apparatus in accordance with claim 8 wherein said dye means comprising:
a pocket having communication with a portion of said pellet distal to said aperture; and
a soluble dye filling said pocket.

10. An apparatus in accordance with claim 9 wherein:
said dye pocket having a location within said pellet so that release of said dye into said fluid signals the imminent exhaustion of said chemical.

11. An apparatus in accordance with claim 9 wherein said dye pocket having a location external to said pellet so that release of said dye into said fluid signals complete exhaustion of said chemical.

* * * * *